(12) United States Patent
Park et al.

(10) Patent No.: US 12,481,658 B1
(45) Date of Patent: Nov. 25, 2025

(54) CREATING DOMAIN-SPECIFIC LANGUAGE REPRESENTATIONS OF CHEMICAL STRUCTURES

(71) Applicant: International Business Machines Corporation, Armonk, NY (US)

(72) Inventors: Nathaniel H. Park, San Jose, CA (US); Tim Erdmann, San Jose, CA (US); James L. Hedrick, Pleasanton, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/797,730

(22) Filed: Aug. 8, 2024

(51) Int. Cl.
    *G06F 16/2455* (2019.01)
    *G06N 3/092* (2023.01)

(52) U.S. Cl.
    CPC ......... *G06F 16/2455* (2019.01); *G06N 3/092* (2023.01)

(58) Field of Classification Search
    CPC ............................ G06F 16/2455; G06N 3/092
    See application file for complete search history.

(56) References Cited

U.S. PATENT DOCUMENTS

| | | | |
|---|---|---|---|
| 10,366,779 B2 * | 7/2019 | Hsu | G16C 20/70 |
| 2020/0151221 A1 * | 5/2020 | Oh | G16C 20/40 |
| 2021/0027862 A1 | 1/2021 | Wei et al. | |
| 2021/0210317 A1 * | 7/2021 | Mistrik | G16C 20/40 |
| 2021/0304852 A1 | 9/2021 | Ristoski et al. | |
| 2021/0342745 A1 | 11/2021 | Zeiler et al. | |
| 2022/0122697 A1 | 4/2022 | Liu et al. | |
| 2022/0293216 A1 | 9/2022 | Park et al. | |
| 2024/0331235 A1 * | 10/2024 | Smock | G16C 20/70 |

FOREIGN PATENT DOCUMENTS

| | | |
|---|---|---|
| CN | 112289372 A | 1/2021 |
| CN | 117194638 A | 12/2023 |

OTHER PUBLICATIONS

Bober-Irizar et al., Neural networks for abstraction and reasoning: Towards broad generalization in machines, arXiv:2402.03507v1 [cs.AI] Feb. 5, 2024.

Yosikawa et al., Large language models for chemistry robotics, Autonomous Robots (2023) 47:1057-1086.

Park et al, "An extensible platform for enabling artificial intelligence guided design of catalysts and materials", ChemRxiv, Feb. 13, 2023, 18 pages.

* cited by examiner

*Primary Examiner* — Etienne P Leroux
(74) *Attorney, Agent, or Firm* — Patterson + Sheridan, LLP

(57) ABSTRACT

A method for receiving a textual description of a first chemical structure; applying a first machine learning model to the textual description to generate a first data structure indicating components of the first chemical structure and bonds between the components of the first chemical structure; applying a second machine learning model to the first data structure to generate a first description of the first chemical structure using a domain specific language; and querying a database using the first description such that the database outputs a second description of a second chemical structure using the domain specific language stored in the database.

20 Claims, 5 Drawing Sheets

CREATING DOMAIN-SPECIFIC LANGUAGE REPRESENTATIONS OF CHEMICAL STRUCTURES

BACKGROUND

The present disclosure relates to chemical structures, and more specifically, to ways chemical structures can be represented in computing systems. Chemical structures representations of the arrangement of atoms within a molecule or other chemical substance. This representation illustrates how the atoms are connected by bonds, and their spatial orientation. Chemical structures can be shown using various notations. Examples include but are not limited to, molecular formulas, structural formulas, skeletal formulas, three dimensional models, textual descriptions, images, graphs, etc. These representations can be used to predict the behavior of molecules in different contexts, such as chemical reactions, biological interactions, etc.

Simplified molecular input line entry systems (SMILES), MolBlock, and SMILES arbitrary target specification (SMARTS), as well as natural language, are ways of representing chemical structures in computer systems. SMILES encodes a molecule's structure as a linear string of characters that captures the connectivity and configuration of atoms and bonds in compact forms. SMARTS extends SMILES to describe the substructure patterns and molecular fragments of chemical structures. MolBlock enables three dimensional visualizations of chemical structures by facilitating processing of detailed information pertaining to atomic bonds and space of a chemical structure. More ways of representing chemical structures on computer systems include using simple images and natural language queries describing molecular structures.

SUMMARY

According to an embodiment, a method includes: receiving a textual description of a first chemical structure; applying a first machine learning model to the textual description to generate a first data structure indicating components of the first chemical structure and bonds between the components of the first chemical structure; applying a second machine learning model to the first data structure to generate a first description of the first chemical structure using a domain specific language; and querying a database using the first description such that the database outputs a second description of a second chemical structure using the domain specific language stored in the database. Other embodiments can include a computer system or a computer-readable storage media that perform the method.

DETAILED DESCRIPTION

Figure 1:
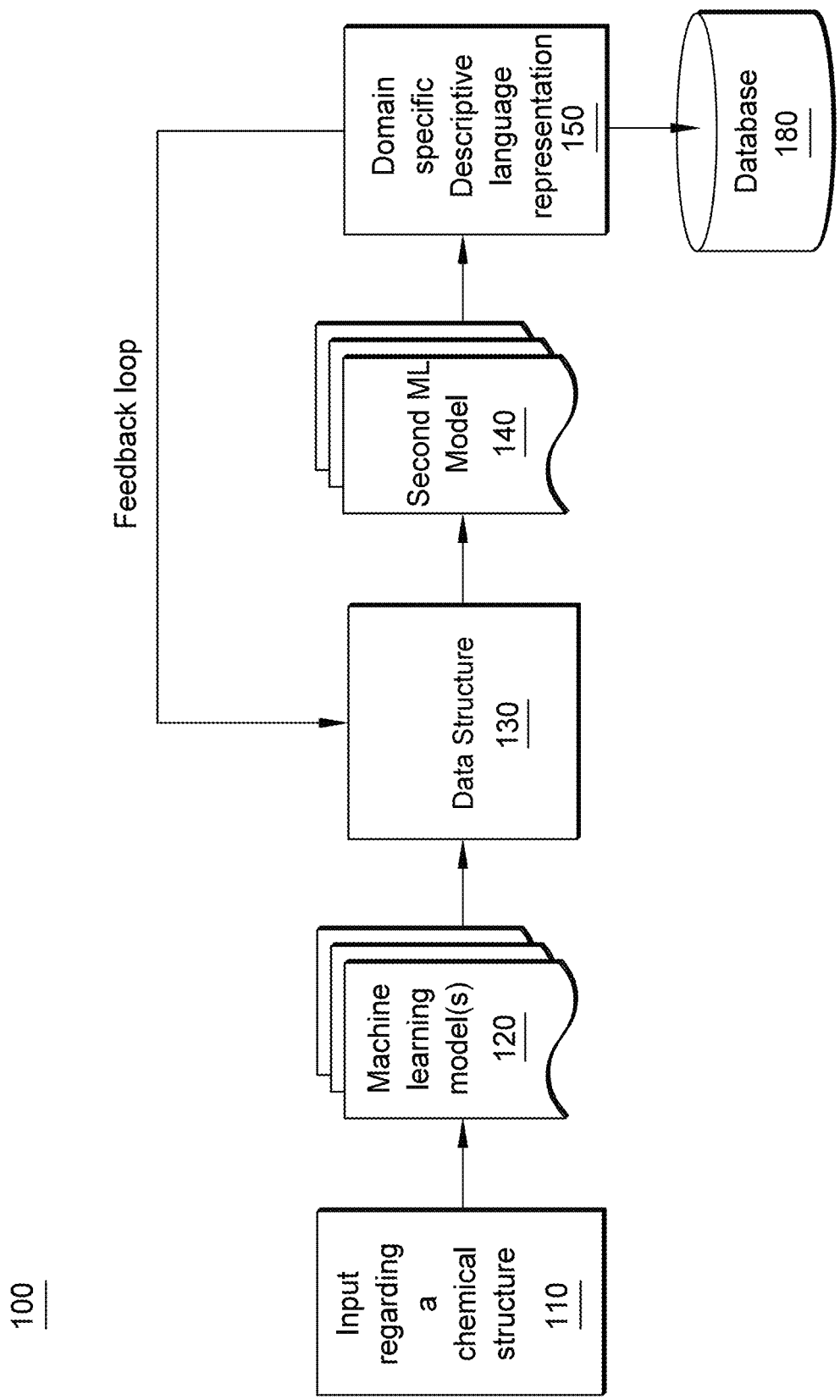
FIG. 1 illustrates an example operation performed by a computer system, according to some embodiments.

According to an embodiment, a method includes: receiving a textual description of a first chemical structure; applying a first machine learning model to the textual description to generate a first data structure indicating components of the first chemical structure and bonds between the components of the first chemical structure; applying a second machine learning model to the first data structure to generate a first description of the first chemical structure using a domain specific language; and querying a database using the first description such that the database outputs a second description of a second chemical structure using the domain specific language stored in the database. By performing the method, various machine learning models are used to quickly and automatically generate a description of a chemical structure using a domain specific language. AI systems can use the description to generate accurate predictions in the context of chemical structures.

Also in an embodiment, the method also includes receiving an image of the first chemical structure; and applying a third machine learning model to the image to generate a second data structure indicating components of the first chemical structure and bonds between components of the first chemical structure, where generating the first description of the first chemical structure is based on applying the second machine learning model to the first data structure and the second data structure. The third machine learning model may be a reinforcement learning model. As a result, images of a chemical structure may also be considered when generating the description of the chemical structure.

Also in some embodiments, the textual description of the previously mentioned method is a natural language description of the first chemical structure. As a result, the machine learning models may consider natural language descriptions when generating the description of the chemical structure.

Also in some embodiments, the first machine learning model of the method is a large language model (LLM). Thus, LLMs may be used to generate the description of the chemical structure.

Also in some embodiments, the second machine learning model of the method is a multi-modal machine learning model that translates the components of the first chemical structure and the bonds between the components of the first chemical structure to a domain specific language representation. The multi-modal model considers different types of outputs from different types of machine learning models to generate the description of the chemical structure.

Also in some embodiments, method also includes updating the first machine learning model based at least in part on the first description. In this manner, the machine learning model is further trained based on the outputs of other machine learning models.

According to another embodiment, a system includes one or more processors; and a memory configured to store an application which when executed by any combination of the one or more processors performs an operation, the operation including: receiving a textual description of a first chemical structure; applying a first machine learning model to the textual description to generate a first data structure indicating components of the first chemical structure and bonds between the components of the first chemical structure; applying a second machine learning model to the first data structure to generate a first description of the first chemical structure using a domain specific language; and querying a database using the first description such that the database outputs a second description of a second chemical structure using the domain specific language stored in the database. Using this system, various machine learning models are used to quickly and automatically generate a description of a chemical structure using a domain specific language. AI systems can use the description to generate accurate predictions in the context of chemical structures.

Also in some embodiments, the operation also includes: receiving an image of the first chemical structure; and applying a third machine learning model to the image to generate a second data structure indicating components of the first chemical structure and bonds between components of the first chemical structure, where generating the first description of the first chemical structure is based on applying the second machine learning model to the first data structure and the second data structure. The third machine learning model may be a reinforcement learning model. As a result, images of a chemical structure may also be considered when generating the description of the chemical structure.

Also in some embodiments, the textual description of the system is a natural language description of the first chemical structure As a result, the machine learning models may consider natural language descriptions when generating the description of the chemical structure.

Also in some embodiments, the first machine learning model of the system is a large language model (LLM). Thus, LLMs may be used to generate the description of the chemical structure.

Also in some embodiments, the second machine learning model of the system is a multi-modal machine learning model that translates the components of the first chemical structure and the bonds between the components of the first chemical structure to a domain specific language representation. The multi-modal model considers different types of outputs from different types of machine learning models to generate the description of the chemical structure.

Also in some embodiments, the operation of the system also includes updating the first machine learning model based at least in part on the first description. In this manner, the machine learning model is further trained based on the outputs of other machine learning models.

According to another embodiment, computer program product including: one or more computer-readable storage media; and program instructions stored on the one or more computer-readable storage media to perform operations including: receiving a textual description of a first chemical structure; applying a first machine learning model to the textual description to generate a first data structure indicating components of the first chemical structure and bonds between the components of the first chemical structure; applying a second machine learning model to the first data structure to generate a first description of the first chemical structure using a domain specific language; and querying a database using the first description such that the database outputs a second description of a second chemical structure using the domain specific language stored in the database. AI models can use the description to generate accurate predictions in the context of chemical structures.

Also in some embodiments, the computer program product operations further include: receiving an image of the first chemical structure; and applying a third machine learning model to the image to generate a second data structure indicating components of the first chemical structure and bonds between components of the first chemical structure, where generating the first description of the first chemical structure is based on applying the second machine learning model to the first data structure and the second data structure. The third machine learning model may be a reinforcement learning model. As a result, images of a chemical structure may also be considered when generating the description of the chemical structure.

Also in some embodiments, the textual description of the computer program product is a natural language description of the first chemical structure. As a result, the machine learning models may consider natural language descriptions when generating the description of the chemical structure.

Also in some embodiments, the first machine learning model of the computer program product is a large language model (LLM). Thus, LLMs may be used to generate the description of the chemical structure.

Also in some embodiments, the second machine learning model of the computer program product is a multi-modal machine learning model that translates the components of the first chemical structure and the bonds between the components of the first chemical structure to a domain specific language representation. The multi-modal model considers different types of outputs from different types of machine learning models to generate the description of the chemical structure.

Chemical structures can be represented in various ways. For example, in computing systems, chemical structures can be represented using SMARTS representations, images, SMILES representations, natural language descriptions, among others. A chemical structure representation can contain valuable information for understanding and predicting the behavior of a molecule. For example, the connectivity of atoms and the types of bonds can reveal the molecule's framework. The framework may be helpful in identifying the compound and understanding the chemical properties of the structure. Structural details such as functional groups and stereochemistry (or the spatial arrangement of atoms) can influence the molecule's reactivity, polarity, solubility, and biological activity, among other things. This information can help chemists design new compounds with desired properties.

Chemical structure representations may also be used during computational analysis and simulations. For example, molecular modeling and chemical calculations can indicate the molecule's physical and chemical properties. Such properties can include boiling points, melting points, stability, and reactivity, among others. Representations can also facilitate identifying interactions with biological targets, which can be helpful in drug design and discovery. Analyzing the chemical structure allows researchers to predict how a molecule might bind to a protein or an enzyme, among other things. These representations, however, are difficult for AI systems to interpret correctly, and in turn, make it difficult for AI systems to generate accurate predictions in the context of chemical structures.

The present disclosure describes a system (e.g., the computer system 500 shown in FIG. 5) that transforms representations of chemical structures into a domain specific readable format that AI systems can interpret and use for making predictions. The domain specific readable format of the chemical structure representations may be stored in an accessible database and include relevant information of the chemical structure extracted from its initial representation.

In particular embodiments, the system provides several technical advantages. For example, embodiments improve efficiency and accuracy when generating predictions in the context of chemical structures. The various machine learning models used can quickly and automatically generate a description of a chemical structure using a domain specific language. AI systems can use the description to generate accurate predictions in the context of chemical structures.

Figure 5:
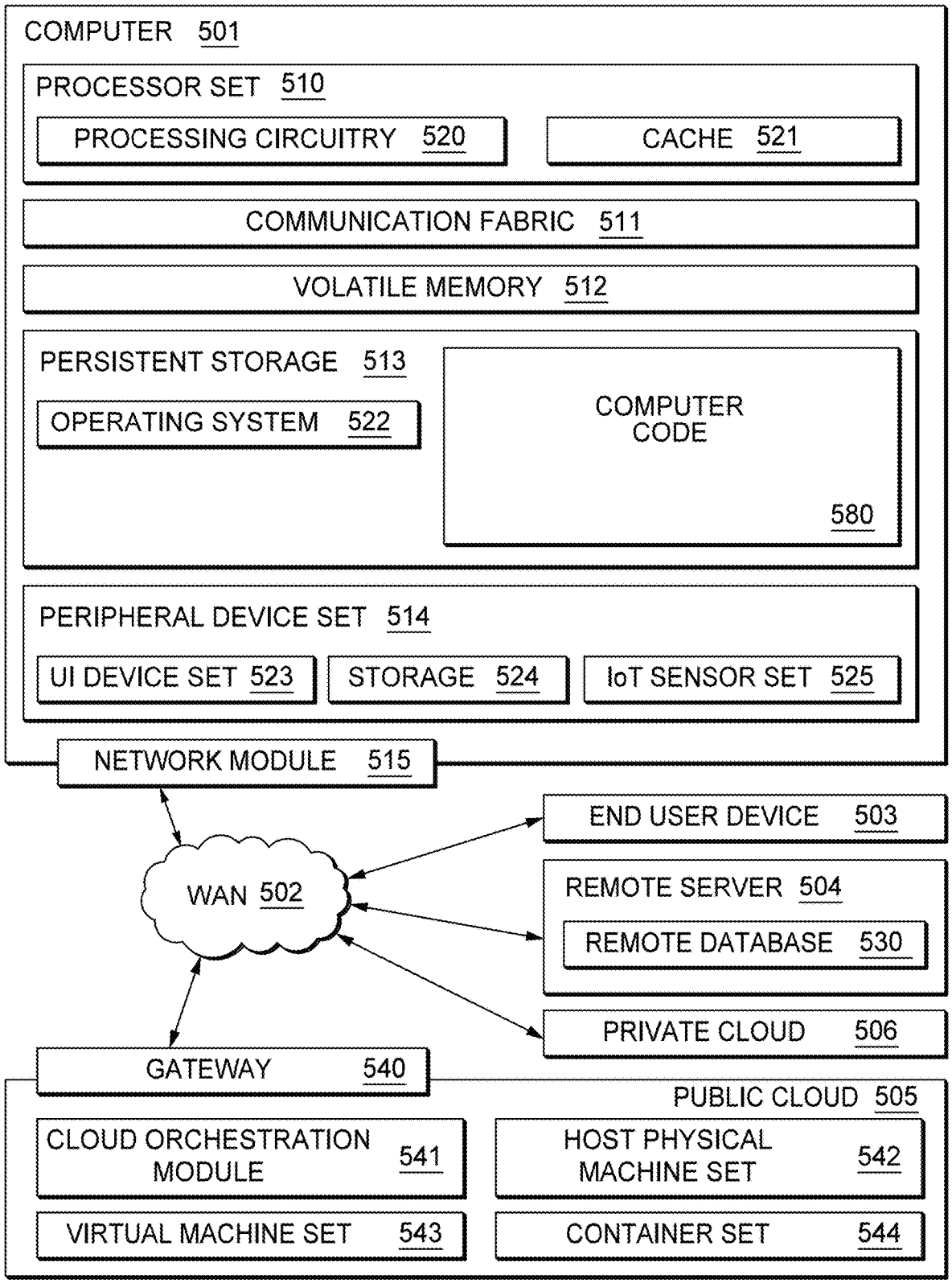
FIG. 5 illustrates a computing environment, according to some embodiments.

FIG. 1 illustrates an example operation 100, which may be performed by a computer system (e.g., the computer system 500 shown in FIG. 5). Generally, the computer system 100 uses various machine learning models to generate a domain specific descriptive language representation 150 of a chemical structure. Machine learning as discussed herein includes concepts such as large scale foundation models and LLMs and LLM powered agents. The computer system then stores that domain specific descriptive language representation 150 to a database 180. The computer system 100 receives, from a user, input 110 describing a chemical structure. The computer system processes the input 110 using one or more ML models 120 to generate a data structure representation 130 of the chemical structure's components. The computer system uses one or more second ML models 140 to analyze the data structure representation 130 to generate a domain specific descriptive language representation 150 of the chemical structure. The computer system stores the generated domain specific descriptive language representation 150 in the database 180. As a way of ensuring that the domain specific descriptive language representation 150 of the chemical structure is valid, the computer system 100 can query the database 180, comparing the new data of the domain specific descriptive language representation 150 to existing entries of the database 180.

Figure 2:
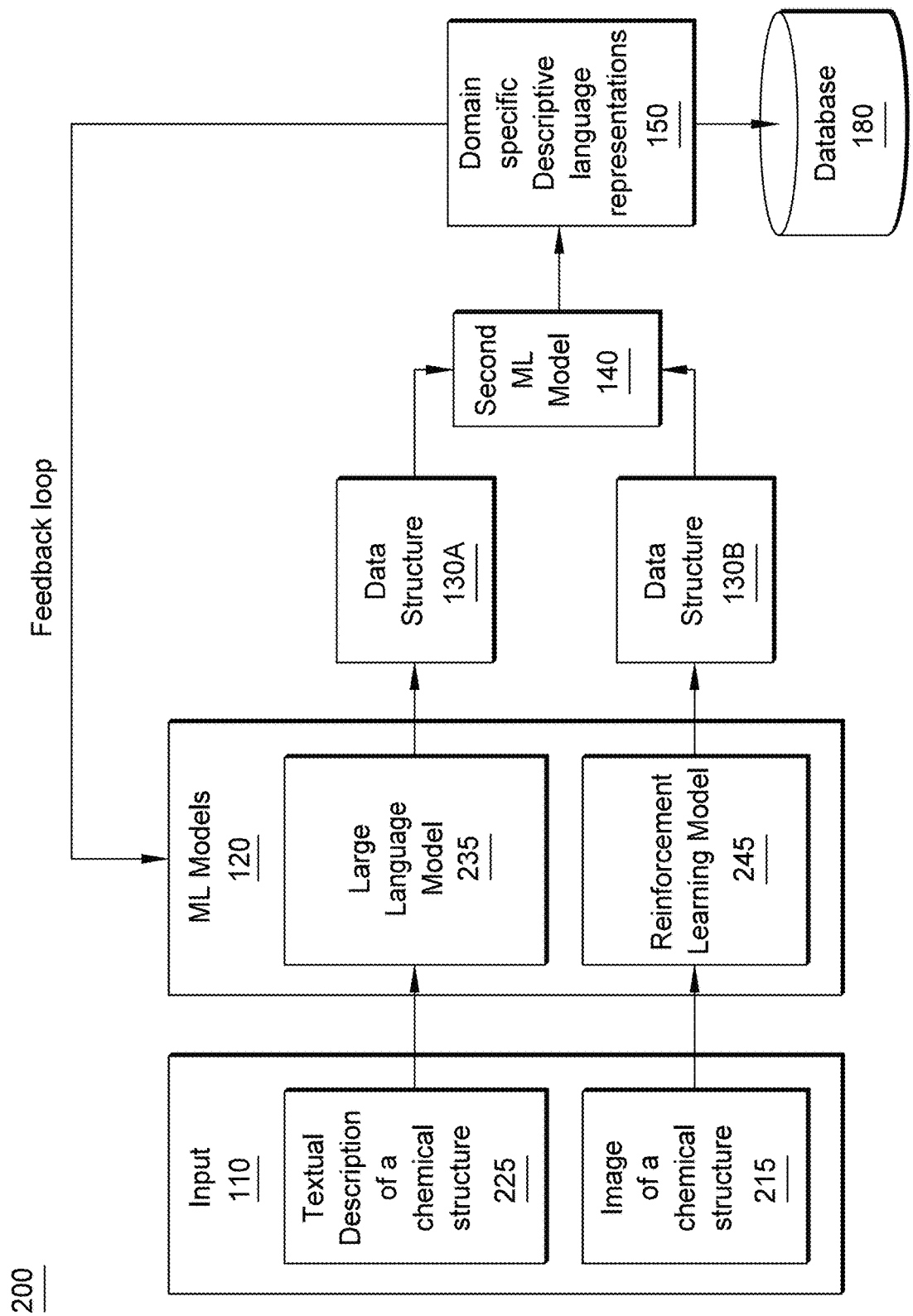
FIG. 2 illustrates an example operation performed by a computer system, according to some embodiments.

The input 110 describing the chemical structure can range in complexity and can include multiple formats. Such formats can include a natural language description of the chemical structure, an electronic representation of the chemical structure, a computer image of the chemical structure, etc. FIG. 2 The ML models 120 analyze the input 110, based on the type of input 110, to output a data structure representation 130 of the chemical structure described by the input 201. The ML models 120 can include large language models, reinforcement learning models, etc. Further details are discussed with respect to FIG. 3. FIG. 2

The ML models 120 generate a data structure 130 that represents relevant aspects of the chemical structure described by the input 110. Generating the data structure 130 to represent the chemical structure 120 may involve steps that include translating the molecular composition and spatial arrangement of atoms extracted from the input 110 into a structured, computable format. For example, the steps may include parsing a description or notation of the chemical structure described by the input 110. The parsing process identifies individual atoms, the types of bonds between the atoms, or any relevant stereochemistry. Another step may include using the information from the parsing step and constructing the data structure 130 itself. For example, the computer system may create a molecular graph that represents atoms as nodes and represents bonds as edges. The nodes store properties such as the atom's element type, charge, hybridization state, etc. The edges store bond type information, such as whether the bond is a single bond, triple bond, aromatic bond, etc. The computer system traverses the parsed data to build the graph, ensuring connectivity and bond types according to the molecular description. Other data structures 130 may include connection tables, adjacency matrices, among others. Connection tables list the atoms and bonds involved in the input 110 describing the chemical structure in a tabular format. Adjacency matrices represent molecules as a square matrix where rows and columns correspond to atoms, and matrix elements indicate the presence and type of bonds between pairs of atoms. The data structure 130 generated by the ML models 120 may not be limited to the examples discussed above.

Using the data structure 130, the second ML model(s) 140 produce a domain specific descriptive language representation 150 of the chemical structure. The second ML model 140 may be a multi-modal model that processes and integrates multiple types of data inputs, which is discussed in more detail in FIG. 2. The domain specific descriptive language representation 150 produced by the second ML model 140 may be in a format that improves readability and retrievability for AI systems. There are many benefits associated with the second ML model 140 using the data structure 130 to produce a domain specific descriptive language representation 150 of the chemical structure. These benefits include but are not limited to more accurate data encoding, reducing ambiguities, and ensuring that critical details from the user input is preserved. Additionally, domain specific representations enhance interoperability and standardization across tools and platforms, facilitating seamless data exchange and more effective analysis. This also allows sophisticated querying and manipulation of data, improving the efficiency and depth of research and applications.

An example of a domain specific descriptive language representation 150 is a chemical markdown language (CMDL) file. A CMDL data format represents chemical structures and reactions in a structured, standardized way. CMDL, among other types of domain specific descriptive language representations of chemical structures, facilitates the exchange, storage, and manipulation of chemical information within and between software systems. This allows the description to be interpretable by a plurality of different AI systems, among other things. The markup language, used in CMDL files provides a flexible and extendible framework for encoding detailed chemical data. This data is extracted by the second ML model 140 from the data structure 130. The encoded detailed chemical data may include molecular structures, reaction mechanisms, associated metadata, etc. CMDL may allow for the precise representation of complex chemical entities by using a text-based format that is more easily read and interpreted by computers than other types of general representations of chemical structures. For example, CMDL may encode information about atoms, bonds, stereochemistry, and molecular fragments, allowing comprehensive descriptions of both simple and complex molecules. Additionally, CMDL supports annotation of chemical reactions, capturing information about reactants, products, catalysts, and reaction conditions.

Other benefits of CMDL or other domain specific descriptive language representations include their extendibility. Such files accommodate evolving scientific needs and new types of chemical information. Researchers and users can extend CMDL or other domain specific descriptive language representations to include additional data fields or custom annotations for their research domains. This adaptability ensures that the representations remain relevant and useful as new discoveries and technologies emerge in chemistry. CMDL or other domain specific descriptive language representations represent a robust and versatile tool for managing chemical data in a standardized and efficient manner, supporting the advancement of research and innovation in chemistry and related disciplines.

Domain specific designed files offer advantages over other types of representations of chemical structures. Domain specific files and language here can be tailored for chemical data, allowing the data's intricate details from the data structure 130 to be captured with high precision and readability. Standardization also facilitates consistent data exchange and interpretation across different platforms and software tools. This provides improvements in scientific research, ensuring that the chemical data is accurately and uniformly understood by the parties involved.

Once the domain specific descriptive language representation 150 is created, it can be stored, alongside other representations, in the database 180. The database 180 with domain specific descriptive language representations, such as the domain specific descriptive language representation 150, is equipped to handle sophisticated querying and manipulation of data.

The computer system implements a feedback loop to validate the domain specific descriptive language representation 150 of the chemical structure. This feedback loop may maintain data integrity and accuracy of the data stored in the database 180. During pre-validation, where the domain specific descriptive language representation 150 is generated, the computer system may ensure that certain fields are accounted for. For example, the computer system may ensure numerical values are in acceptable ranges and that text fields do not exceed character limits, among other things. Following pre-validation, the computer system queries the existing database 180 to check for potential duplicates or conflicts, which may involve searching the database 180 for entries that match or closely resemble the new domain specific descriptive language representation 150 entry based on key identifiers or attributes. The computer system may analyze the results of this query to determine the validity of the new entry. If duplicates or conflicts are found, the computer system generates feedback highlighting the issues. The computer system may use the feedback to adjust the ML models 120 or the second ML model 140. The computer system may also adjust the domain specific descriptive language representation 150 based on the feedback.

FIG. 2 illustrates an example operation 200 performed by a computer system (e.g., the computer system 500 shown in FIG. 5). As seen in FIG. 2, the computer system receives various types of input 110. For example, the input 110 may include a textual description 225 of a chemical structure and/or an image 215 of the chemical structure. When the input 110 includes a textual description 225, the computer system uses a LLM 235 to generate a data structure 130A to represent the chemical structure as described in the textual description 225. When the input 110 includes an image 215, the computer system uses a reinforcement learning (RL) model 245 to generate a data structure 130B to represent the chemical structure as shown in the image 215. As described above, the second ML model 140 may be a multi-modal model that analyzes input from both the LLM 235 and the RL model 245 to produce a domain specific descriptive language representation 150 of the chemical structure. The domain specific descriptive language representation 150 may be a CMDL file, among other things. The computer system uses the feedback loop to validate the domain specific descriptive language representation 150.

The textual description 225 of the chemical structure may include a variety of formats. For example, the textual description 225 may be a general natural language description of a chemical structure, or the textual description 225 may be a more standardized notation. For example, the textual description 225 may be a simplified molecular input line entry system (SMILES), which encodes the chemical structure using a linear string of text. The textual description 225 may be human readable or machine readable, such as using SMILES.

The input 110 may include an image 215 of the chemical structure. The chemical structure can be depicted as an image on a computational device in file formats such as PNG, and SVG, among others. The image 215 may show representations of the arrangement and connectivity of atoms within a molecule. These depictions use symbols and lines to illustrate the way atoms are bonded together. They may show the molecular geometry and the types of bonds between atoms. For example, carbon atoms may be shown as black circles, hydrogen as white circles, and oxygen as red circles. The visual representations can also convey more complex information about the molecule. For example, the three dimensional orientations of atoms in space may be depicted. Images can also include annotations indicating partial charges, electron density, etc.

Depending on the format, the computer system uses different types of machine learning models to generate the data structures 130 representing the chemical structures. Furthermore, the representations of the chemical structure may vary depending on the types of input 110. For example, when the input 110 includes a textual description 225 of the chemical structure, the LLM 235 may interpret the textual description 225 and produce the data structure 130A accordingly. The LLM 235 may generate the data structure 130B by leveraging deep learning capabilities and training on chemical data and natural language. After the LLM 235 receives the textual description 225 (which can come in many forms, such as a SMILES string, an international union of pure and applied chemistry (IUPAC) name, or a natural language description, among other things), the LLM 235 may interpret the textual description 225. The LLM 235 parses the textual description 225 to extract relevant chemical information. If the input 110 is a standardized format, such as SMILES, the LLM 235 interprets the string to understand the atomic composition and connectivity in the chemical structure. For example, the SMILES string "CCO" represents ethanol, with two carbon atoms and one oxygen atom. The LLM 235 can interpret "CCO" as ethanol. If the input 110 is a natural language description of a molecule, the LLM 235 uses chemical terminology and context to deduce the structure of the molecule. The LLM 235 identifies key components such as functional groups, the number of atoms, the arrangement of atoms, etc. Using the parsed information, the LLM 235 constructs the data structure 130A to represent the chemical structure. The data structure 130B may take the form of a graph in which nodes represent atoms and edges represent bonds, along with attributes for bond types and stereochemistry. For example, in the case of ethanol, the LLM 235 may create a graph with nodes for two carbon atoms and one oxygen atom, with the edges representing the bonds between the atoms. The data structure 130A may include 235 different formats. For example, the data structure 130B may include a JSON object, or a dictionary, among other things.

When the input 110 includes an image 215 of the chemical structure, the computer system uses a RL model 245 to generate the data structure 130B representing the chemical structure. Using the RL model 245 to create the data structure 130B may leverage the strengths of reinforcement learning in handing complex decision making processes, making it reliable for interpreting chemical structures from visual inputs. An RL model, such as RL model 245 may be trained to recognize and interpret chemical structures from visual inputs. Training the RL model 245 may involve feeding the model a large dataset of images of chemical structures paired with their corresponding textual representations or data structures. The RL model 245 may incorporate convolutional neural networks for image recognition and may learn to identify atoms, bonds, and their arrangement within a molecule. The model's objective may be to maximize accuracy in interpreting these features (and other features), guided by a reward system that reinforces correct identifications and penalizes errors.

During the training phase, the RL model 245 may perform a series of actions to transform an image 215 into the data structure 130B. These actions may include identifying atomic symbols, detecting bond types, and determining the spatial arrangement of atoms, among other things. The actions taken by the RL model 245 may be evaluated. Rewards can be given for correct actions while penalties may be imposed for mistakes. Over time, the RL model 245 may learn to optimize actions to accurately construct the chemical structure from an image 215, with the goal of improving performance as more iterations are done.

Once the RL model 245 is adequately trained, the computer system deploys the RL model 245 to process new images of chemical structures. The RL model 245 may analyze the image 215 of the chemical structure to identify and interpret different elements of the chemical structure. The resulting data structure 130B may be in a JSON file format, XML file format, or other cheminformatics compatible formats.

The computer system may train the second ML model 140 to convert data structures 130 representing chemical structures into domain specific descriptive language representations 150, such as CMDL. The second ML model 140 may be trained on a dataset that includes data strictures paired with their corresponding CMDL or domain specific descriptive language representations 150. The training allows the second ML model 140 to learn the mapping between the raw data and the structured output format. During the training phase, the second ML model 140 may use various techniques, such as sequence to sequence learning, or transformer architectures, among other things, to understand how to convert the input data into the desired output format. For example, a sequence to sequence model with attention mechanisms may be used to generate a CMDL file line by line, ensuring that the parts of the data structure are correctly translated into the corresponding CMDL syntax. Once trained, the second ML model 140 can take new input data, such as the generated data structures 130, and generate domain specific descriptive language representations 150, such as CMDL files.

Using the feedback mechanism discussed in FIG. 1, the computer system 100 may validate the domain specific descriptive language representation 150 and store the domain specific descriptive language representation 150 in the database 180.

Figure 3:
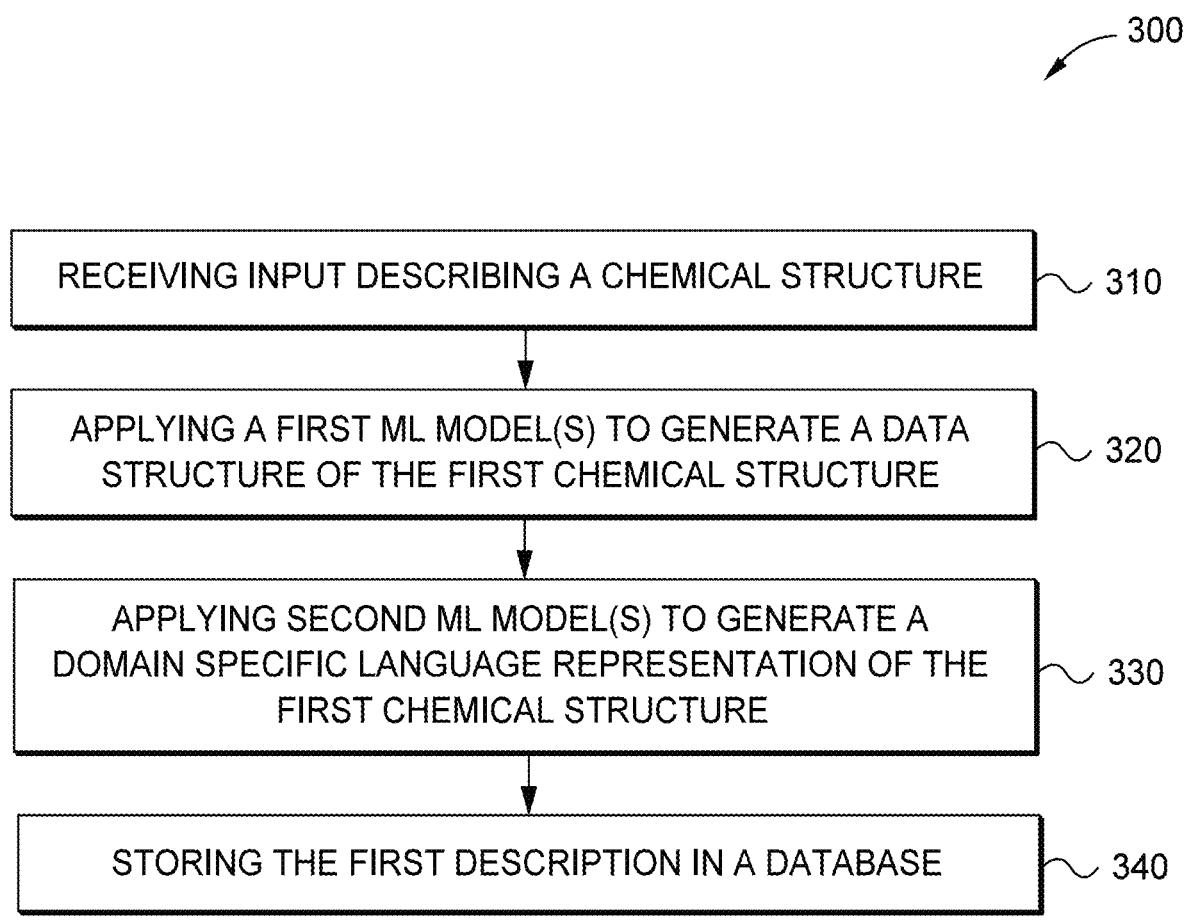
FIG. 3 is a flowchart of an example method performed by a computer system, according to some embodiments.

FIG. 3 is a flowchart of an example method 300 performed by a computer system (e.g., the computer system 500 shown in FIG. 5). By performing the method 300, the computer system generates a domain specific language representation of the inputted chemical structure and stores the representation in a database.

At block 310, the computer system receives input describing a chemical structure. As discussed, this input can be of a variety of formats, such as a textual description or an image. Even amongst these two formats, sub formats of a textual description can include generic natural language, SMILES, among other things, and sub formats of images can include PNG files, SVM files, among other things. The textual description may use words to describe characteristics of the chemical structure (e.g., atoms, bonds, shape, structure, spatial configuration, electron density, etc.). The image may depict the chemical structure (e.g., the atoms, bonds, shape, structure, etc.).

At block 320, the computer system applies a first ML model(s) to the input to generate a data structure representing the chemical structure. As discussed, depending on the input type, different types of ML models may be used to generate the data structure. For example, an RL model may be used if the input includes an image, and/or an LLM may be used if the input includes a textual format. Furthermore, depending on the sub structure, different types of data structures may be produced.

At block 330, the computer system applies a second ML model to the data structure(s) from the first set of ML models to generate a domain specific description of the chemical structure. As discussed above, the ability to convert data structures or other representations into a domain specific language representation, such as CMDL, enhances the efficiency and accuracy of data handling in cheminformatics. As a result, the computer system automates a complex and tedious process, reducing the likelihood of human error and ensuring consistency across datasets. This capability provides seamless integration of chemical data into various software tools and databases, facilitating advanced analysis and promoting more effective research and collaboration in chemical sciences.

At block 340, the computer system stores the generated domain specific language representation of the inputted chemical structure in a database. The representation can be organized structurally such that indexing and metadata tagging can be applied to facilitate efficient querying and retrieval. As a result, the database provides robust storage, search, and management of the complex chemical information represented in the domain specific language, such as a CMDL file format. Converting to a domain specific language representation, such as CMDL, may provide several benefits. One advantage includes the ability to standardize the way chemical information is represented and communicated, allowing the data to be uniformly understood and interpreted so that accurate predictions regarding chemical structures can be made. CMDL in particular provides a consistent format for encoding molecular structures, reactions, and properties, ensuring that data is uniformly understood and interpreted across various platforms and applications. Standardization facilitates seamless data exchange and integration, enhancing collaboration among researchers, and compatibility between different software tools. CMDL may also capture detailed and complex chemical information. CMDL can encode not only basic structures of molecules, but also intricate details such as stereochemistry, isotopic composition, and electronic properties. This richness of detail allows for more accurate modeling and simulation of chemical behaviors, improving research and development in areas such as drug discovery, material science, and chemical engineering. Additionally, the structure of CMDL makes it both human-readable and machine readable, enabling easy editing and manipulation by chemists and automated processing by computational systems. CMDL and other domain specific languages also improve the efficiency of managing and querying large chemical databases. By providing well defined schema for chemical data, these languages enable sophisticated search and retrieval functionalities. For example, users may perform complex queries to find molecules with certain substructures or properties, leveraging the detailed information encoded in CMDL or another domain specific language. This capability enhances data mining and knowledge discovery, allowing valuable insights to be extracted from vast chemical datasets. Domain specific language representations, like CMDL, offer robust tools for standardizing, detailing and efficiently managing chemical information.

Figure 4:
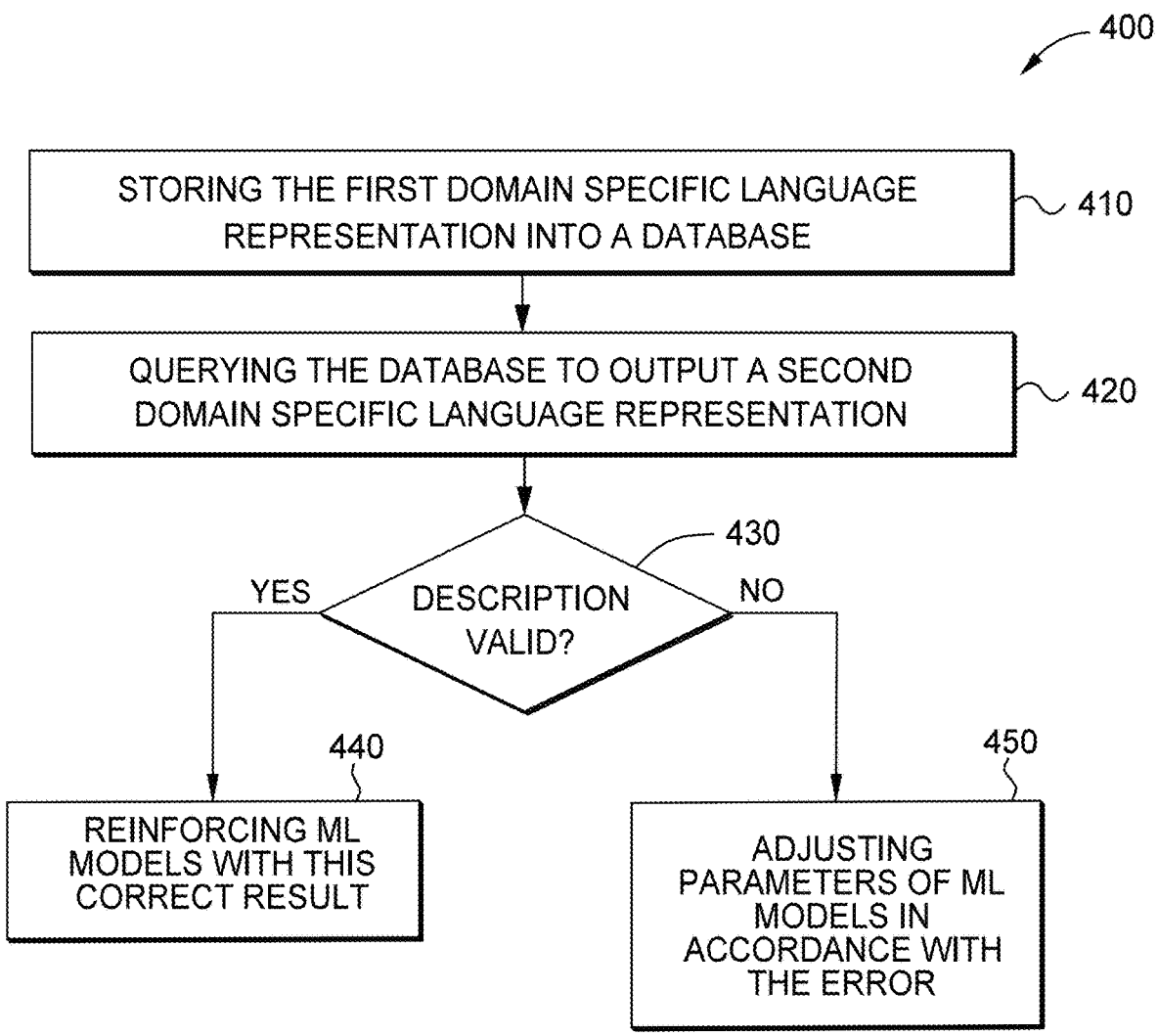
FIG. 4 is a flowchart of an example method performed by a computer system, according to some embodiments.

FIG. 4 is a flowchart of an example method 400 performed by a computer system (e.g., the computer system 500 shown in FIG. 5). By performing the method 400, the computer system provides a feedback mechanism that validates the domain specific language representations of chemical structures.

At block 410, the computer system stores a first domain specific language representation of the data structure into the previously mentioned database. At block 420, the computer system queries the database to retrieve a second description of the chemical structure. The query can be a direct search for specific attributes or a more complex query involving multiple parameters. For example, the query may include the compound's name, the molecular formula, or other identifiers. The database processes the query, searching through the stored data to find records that match the query criteria. The database may compare the inputted description against the relevant fields in the database entries.

At block 430, a feedback loop is implemented using both the first and the second domain specific language representations. The feedback loop determines whether or not the first generated description is valid. Upon generating the first domain specific language description, and then performing the steps of block 420 to ensure the syntax of the first domain specific language description is valid, the semantic validation may be performed. This involves comparing the first generated domain specific language representation against known chemical rules and existing database entries, or the second generated domain specific language representation. This involves verifying that the chemical structure is chemically plausible and does not violate fundamental principles, such as valence rules. Additionally, the system cross references the new entry with existing records to check for duplicates or inconsistences. If the entry matches existing records exactly, it may be flagged as a duplicate. If there are minor discrepancies, the system may report further review of potential conflicts.

If there are conflicts, the flow diagram moves to block 450, where the system adjusts the parameters of the ML models in accordance with the error. This entails providing feedback to the ML models used. Feedback includes detailed information about the nature of the problem, such as syntax, errors, chemical implausibility, or potential duplicates. The models may correct the entry and resubmit for validation. This may be an iterative process until the entry passes validation checks and is deemed valid.

When an entry is deemed valid, the flow diagram moves to block 440, where the system reinforces the ML models with the correct result. This reinforcement step may lead to higher quality data management, reducing the likelihood of the identified errors in the future.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 5 illustrates an example computing environment 500, which contains an example of an environment for the execution of at least some of the computer code involved in performing the inventive methods, such as the computer code 580, which stores domain specific descriptive language of chemical structures. In addition to block 580, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 580, as identified above), peripheral device set 514 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 580 in persistent storage 513.

COMMUNICATION FABRIC 511 is the signal conduction path that allows the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, volatile memory 512 is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface-type operating systems that employ a kernel. The code included in block 580 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing is directed to embodiments of the present disclosure, other and further embodiments may be devised without departing from the basic scope thereof, and the scope thereof is determined by the claims that follow.

What is claimed is:

1. A method comprising:
   receiving a textual description of a first chemical structure;
   applying a first machine learning model to the textual description to generate a first data structure indicating components of the first chemical structure and bonds between the components of the first chemical structure;
   applying a second machine learning model to the first data structure to generate a first description of the first chemical structure using a domain specific language; and
   querying a database using the first description such that the database outputs a second description of a second chemical structure using the domain specific language stored in the database.

2. The method of claim 1 further comprising:
   receiving an image of the first chemical structure; and
   applying a third machine learning model to the image to generate a second data structure indicating components of the first chemical structure and bonds between components of the first chemical structure, wherein generating the first description of the first chemical structure is based on applying the second machine learning model to the first data structure and the second data structure.

3. The method of claim 2, wherein the third machine learning model is a reinforcement learning model.

4. The method of claim 1, wherein the textual description is a natural language description of the first chemical structure.

5. The method of claim 1, wherein the first machine learning model is a large language model (LLM).

6. The method of claim 1, wherein the second machine learning model is a multi-modal machine learning model that translates the components of the first chemical structure and the bonds between the components of the first chemical structure to a domain specific language representation.

7. The method of claim 1, further comprising updating the first machine learning model based at least in part on the first description.

8. A system, comprising:
   one or more processors; and
   a memory configured to store an application which when executed by any combination of the one or more processors performs an operation, the operation comprising:
   receiving a textual description of a first chemical structure;
   applying a first machine learning model to the textual description to generate a first data structure indicating components of the first chemical structure and bonds between the components of the first chemical structure;
   applying a second machine learning model to the first data structure to generate a first description of the first chemical structure using a domain specific language; and
   querying a database using the first description such that the database outputs a second description of a second chemical structure using the domain specific language stored in the database.

9. The system of claim 8, wherein the operation further comprises:
   receiving an image of the first chemical structure; and
   applying a third machine learning model to the image to generate a second data structure indicating components of the first chemical structure and bonds between components of the first chemical structure, wherein generating the first description of the first chemical structure is based on applying the second machine learning model to the first data structure and the second data structure.

10. The system of claim 9, wherein the third machine learning model is a reinforcement learning model.

11. The system of claim 8, wherein the textual description is a natural language description of the first chemical structure.

12. The system of claim 8, wherein the first machine learning model is an LLM.

13. The system of claim 8, wherein the second machine learning model is a multi-modal machine learning model that translates the components of the first chemical structure and the bonds between the components of the first chemical structure to a domain specific language representation.

14. The system of claim 8, wherein the operation further comprises updating the first machine learning model based at least in part on the first description.

15. A computer program product comprising:
   one or more computer-readable storage media; and
   program instructions stored on the one or more computer-readable storage media to perform operations comprising:
   receiving a textual description of a first chemical structure;
   applying a first machine learning model to the textual description to generate a first data structure indicating components of the first chemical structure and bonds between the components of the first chemical structure;
   applying a second machine learning model to the first data structure to generate a first description of the first chemical structure using a domain specific language; and
   querying a database using the first description such that the database outputs a second description of a second chemical structure using the domain specific language stored in the database.

16. The computer program product of claim 15, wherein the operations further comprise:
  receiving an image of the first chemical structure; and
  applying a third machine learning model to the image to generate a second data structure indicating components of the first chemical structure and bonds between components of the first chemical structure, wherein generating the first description of the first chemical structure is based on applying the second machine learning model to the first data structure and the second data structure.

17. The computer program product of claim 16, wherein the third machine learning model is a reinforcement learning model.

18. The computer program product of claim 15, wherein the textual description is a natural language description of the first chemical structure.

19. The computer program product of claim 15, wherein the first machine learning model is an LLM.

20. The computer program product of claim 15, wherein the second machine learning model is a multi-modal machine learning model that translates the components of the first chemical structure and the bonds between the components of the first chemical structure to a domain specific language representation.

* * * * *